United States Patent
Han et al.

(10) Patent No.: US 9,178,663 B2
(45) Date of Patent: Nov. 3, 2015

(54) METHOD AND APPARATUS FOR TRANSMITTING ACK/NACK SIGNALS

(75) Inventors: Seung Hee Han, Anyang-si (KR); Jae Hoon Chung, Anyang-si (KR); Ji Woong Jang, Anyang-si (KR); Moon Il Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 167 days.

(21) Appl. No.: 13/637,339

(22) PCT Filed: Mar. 25, 2011

(86) PCT No.: PCT/KR2011/002075
§ 371 (c)(1),
(2), (4) Date: Sep. 25, 2012

(87) PCT Pub. No.: WO2011/119006
PCT Pub. Date: Sep. 29, 2011

(65) Prior Publication Data
US 2013/0016688 A1    Jan. 17, 2013

Related U.S. Application Data

(60) Provisional application No. 61/317,290, filed on Mar. 25, 2010, provisional application No. 61/318,366, filed on Mar. 28, 2010.

(30) Foreign Application Priority Data

Oct. 28, 2010    (KR) ......................... 10-2010-0105936

(51) Int. Cl.
*H04L 1/18*    (2006.01)
*H04L 1/00*    (2006.01)
*H04L 1/16*    (2006.01)
*H04L 1/12*    (2006.01)

(52) U.S. Cl.
CPC ............ *H04L 1/1812* (2013.01); *H04L 1/0029* (2013.01); *H04L 1/0073* (2013.01); *H04L 1/1621* (2013.01); *H04L 1/1829* (2013.01); *H04L 2001/125* (2013.01)

(58) Field of Classification Search
CPC ................ H04L 1/1812; H04L 1/1829; H04L 2001/125; H04L 1/0073; H04L 1/1621; H04L 1/0029; H04L 1/1861; H04L 5/0055; H04L 1/1893; H04W 72/1278; H03M 13/23; H03M 13/29; H03M 13/2903; H03M 13/6356
See application file for complete search history.

(56) References Cited

U.S. PATENT DOCUMENTS

2001/0025361 A1*    9/2001    Kim .............................. 714/786
2008/0279145 A1    11/2008    Boariu et al.

(Continued)

FOREIGN PATENT DOCUMENTS

| KR | 10-2008-0090730 | 10/2008 |
| WO | 2009142436 | 11/2009 |

OTHER PUBLICATIONS

Non-patent literature (NPL) titled "Computer Organization and Design Fundamentals—Examining Computer Hardware from the Bottom to the Top" by David Tarnoff, Revised First Edition, Published with the assistance of Lulu.com, Jul. 2007, p. 78 lines 1-4 and figure 4-12.*

(Continued)

*Primary Examiner* — Yee Lam
(74) *Attorney, Agent, or Firm* — Lee, Hong, Degerman, Kang & Waimey

(57) ABSTRACT

The present invention relates to a method and apparatus in which a base station transmits a physical ARQ channel (PH-ICH) in a wireless communication system. More particularly, the present invention relates to a method and apparatus for transmitting a PHICH, wherein the method comprises the following steps: generating a plurality of hybrid of ARQ (HARQ) indicators: channel-coding the plurality of HARQ indicators into a single HARQ codeword; and transmitting the HARQ codeword via the PHICH, wherein the value of a portion of the HARQ codeword indicates individual value of each of HARQ indicators, and the value of the rest of the HARQ codeword indicators a value of joint operation of the plurality of HARQ indicators.

4 Claims, 10 Drawing Sheets

(56) References Cited

U.S. PATENT DOCUMENTS

| | | |
|---|---|---|
| 2009/0055703 A1 | 2/2009 | Kim et al. |
| 2009/0245187 A1 | 10/2009 | Nam et al. |
| 2009/0296644 A1* | 12/2009 | Cheon et al. ............... 370/329 |
| 2010/0172308 A1* | 7/2010 | Nam et al. ............... 370/329 |
| 2011/0047432 A1 | 2/2011 | Kim et al. |
| 2011/0075624 A1* | 3/2011 | Papasakellariou et al. ... 370/329 |
| 2011/0122819 A1* | 5/2011 | Jongren et al. ............... 370/328 |
| 2011/0200016 A1* | 8/2011 | Bergman et al. ............... 370/335 |
| 2011/0239075 A1* | 9/2011 | Xu et al. ............... 714/751 |
| 2013/0033979 A1* | 2/2013 | Taoka et al. ............... 370/216 |

OTHER PUBLICATIONS

Huawei, "Considerations on PHICH mapping in LTE-A", R1-101046, 3GPP TSG RAN WG1 Meeting #60, Feb. 2010.
Qualcomm Incorporated, "Phich for CA Operation", R1-101474, 3GPP TSG RAN WG1 #60, Feb. 2010.
The State Intellectual Property Office of the People's Republic of China Application Serial No. 201180015766.1, Office Action dated Jun. 27, 2014, 7 pages.
Motorola, "Uplink ACK/NACK for TDD," 3GPP TSG RAN1 #52-bis, R1-081292, Mar. 2008, 4 pages.
European Patent Office Application Serial No. 11759755.9, Search Report dated May 20, 2015, 13 pages.

* cited by examiner

| HI0 | HI1 | HI codeword $<b_0,b_1,b_2>$ |
|---|---|---|
| 0 | 0 | <0, 0, 0> |
| 0 | 1 | <0, 1, 1> |
| 1 | 0 | <1, 0, 1> |
| 1 | 1 | <1, 1, 0> |

FIG. 11

| HI0 | HI1 | HI codeword $<b_0, b_1, b_2>$ |
|---|---|---|
| 0 | 0 | $<1, 1, 0>$ |
| 0 | 1 | $<1, 0, 1>$ |
| 1 | 0 | $<0, 1, 1>$ |
| 1 | 1 | $<0, 0, 0>$ |

FIG. 12

| HI0 | HI1 | HI codeword $<b_0, b_1, b_2>$ |
|---|---|---|
| 0 | 0 | $<1, 1, 1>$ |
| 0 | 1 | $<1, 0, 0>$ |
| 1 | 0 | $<0, 1, 0>$ |
| 1 | 1 | $<0, 0, 1>$ |

| HI0 | HI1 | HI codeword $<b_0,b_1,b_2>$ |
|---|---|---|
| 0 | 0 | $<0,0,1>$ |
| 0 | 1 | $<0,1,0>$ |
| 1 | 0 | $<1,0,0>$ |
| 1 | 1 | $<1,1,1>$ |

METHOD AND APPARATUS FOR TRANSMITTING ACK/NACK SIGNALS

CROSS-REFERENCE TO RELATED APPLICATIONS

This application is the National Stage filing under 35 U.S.C. 371 of International Application No. PCT/KR2011/002075, filed on Mar. 25, 2011, which claims the benefit of earlier filing date and right of priority to Korean Patent Application No. 10-2010-0105936, filed on Oct. 28, 2010, and also claims the benefit of U.S. Provisional Application Ser. No. 61/317,290, filed on Mar. 25, 2010, and U.S. Provisional Application Ser. No. 61/318,366, filed on Mar. 28, 2010, the contents of which are all hereby incorporated by reference herein in their entirety.

TECHNICAL FIELD

The present invention relates to wireless communication, and more particularly, to a method and apparatus for transmitting a downlink Acknowledgement/Negative Acknowledgement (ACK/NACK) signal.

BACKGROUND ART

Wireless communication systems have been widely deployed to provide various types of communication services such as voice or data. Generally, a wireless communication system is a multiple access system capable of supporting communication with multiple users by sharing available system resources (bandwidth, transmission power, etc.). The multiple access system includes, for example, a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and the like.

DETAILED DESCRIPTION OF THE INVENTION

Technical Problems

An object of the present invention is to provide a method and apparatus for efficiently transmitting a downlink ACK/NACK signal. Another object of the present invention is to provide a method and apparatus for transmitting a plurality of PHICHs using a single PHICH resource.

It will be appreciated by persons skilled in the art that that the technical objects that can be achieved through the present invention are not limited to what has been particularly described hereinabove and other technical objects of the present invention will be more clearly understood from the following detailed description.

Technical Solutions

In an aspect of the present invention, a method for transmitting, at a base station, a Physical Hybrid ARQ Indicator Channel (PHICH) in a wireless communication system includes generating a plurality of Hybrid ARQ (HARQ) indicators; channel-coding the plurality of HARQ indicators to one HARQ codeword; and transmitting the HARQ codeword through the PHICH, wherein some values of the HARQ codeword indicate individual values for the respective HARQ indicators and the other values thereof indicate joint operation values for the plurality of HARQ indicators.

In another aspect of the present invention, a base station configured to transmit a Physical Hybrid ARQ Indicator Channel (PHICH) in a wireless communication system includes a Radio Frequency (RF) unit; and a processor, wherein the processor is configured to generate a plurality of Hybrid ARQ (HARQ) indicators, channel-code the plurality of HARQ indicators to one HARQ codeword, and transmit the HARQ codeword through the PHICH, and wherein some values of the HARQ codeword indicate individual values of the respective HARQ indicators and the other values thereof indicate joint operation values for the plurality of HARQ indicators.

The plurality of HARQ indicators may be two 1-bit HARQ indicators and the HARQ codeword may be 3 bits.

The channel-coding of the plurality of HARQ indicators may satisfy a characteristic in which, when a 4*2 matrix is generated by arbitrarily extracting two columns from a 4*3 matrix corresponding to an HARQ codeword set, rows of the 4*2 matrix indicate different states.

A first bit and a second bit of the HARQ codeword may have the same values as the two HARQ indicators and a third bit of the HARQ codeword may indicate a combined value of the two HARQ indicators.

The third bit may indicate an exclusive OR (XOR) or exclusive NOR (XNOR) operation value of the two HARQ indicators.

In still another aspect of the present invention, a method for processing, at a user equipment, a Physical Hybrid ARQ Indicator Channel (PHICH) in a wireless communication system includes receiving one Hybrid ARQ (HARQ) codeword through the PHICH; channel-coding the HARQ codeword; and confirming a plurality of HARQ indicators from the HARQ codeword, wherein some values of the HARQ codeword indicate individual values for the respective HARQ indicators and the other values thereof indicate joint operation values for the plurality of HARQ indicators.

In a further aspect of the present invention, a user equipment configured to process a Physical Hybrid ARQ Indicator Channel (PHICH) in a wireless communication system includes a Radio Frequency (RF) unit; and a processor, wherein the processor is configured to receive one Hybrid ARQ (HARQ) codeword through the PHICH, channel-code the HARQ codeword, and confirm a plurality of HARQ indicators from the HARQ codeword, and wherein some values of the HARQ codeword indicate individual values for the respective HARQ indicators and the other values thereof indicate joint operation values for the plurality of HARQ indicators.

The plurality of HARQ indicators may be two 1-bit HARQ indicators and the HARQ codeword may be 3 bits.

The channel-coding of the plurality of HARQ indicators may satisfy a characteristic in which, when a 4*2 matrix is generated by arbitrarily extracting two columns from a 4*3 matrix corresponding to an HARQ codeword set, rows of the 4*2 matrix indicate different states.

A first bit and a second bit of the HARQ codeword may have the same values as the two HARQ indicators and a third bit of the HARQ codeword may indicate a combined value of the two HARQ indicators.

The third bit may indicate an exclusive OR (XOR) or exclusive NOR (XNOR) operation value of the two HARQ indicators.

Advantageous Effects

According to embodiments of the present invention, a downlink ACK/NACK signal can be efficiently transmitted in a wireless communication system. In addition, a plurality of PHICHs can be transmitted using a single PHICH resource in a wireless communication system.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIGS. 10 to 13 illustrate examples of channel coding of HIs according to an exemplary embodiment of the present invention; and FIG. 14 is a block diagram illustrating a BS and a UE according to an exemplary embodiment of the present invention.

BEST MODE FOR CARRYING OUT THE INVENTION

The following technology may be used in various wireless access systems, such as CDMA, FDMA, TDMA, OFDMA and SC-FDMA systems. CDMA may be implemented with wireless technology such as Universal Terrestrial Radio Access (UTRA) or CDMA2000. TDMA may be implemented with wireless technology such as Global System for Mobile communications (GSM)/General Packet Radio Service (GPRS)/Enhanced Data Rates for GSM Evolution (EDGE). OFDMA may be implemented with wireless technology such as IEEE 802.11 (Wi-Fi), IEEE 802.16 (WiMAX), IEEE 802.20, and Evolved UTRA (E-UTRA). UTRA is part of a Universal Mobile Telecommunications System (UMTS). 3rd Generation Partnership Project (3GPP) Long Term Evolution (LTE) is a part of an Evolved UMTS (E-UMTS) which uses E-UTRA. LTE-Advanced (LTE-A) is an evolved version of 3GPP LTE.

The following embodiments of the present invention mainly describe 3GPP LTE/LTE-A in order to clarify the description. However, technical spirits of the present invention are not limited to the embodiments of the present invention described herein.

Figure 1:
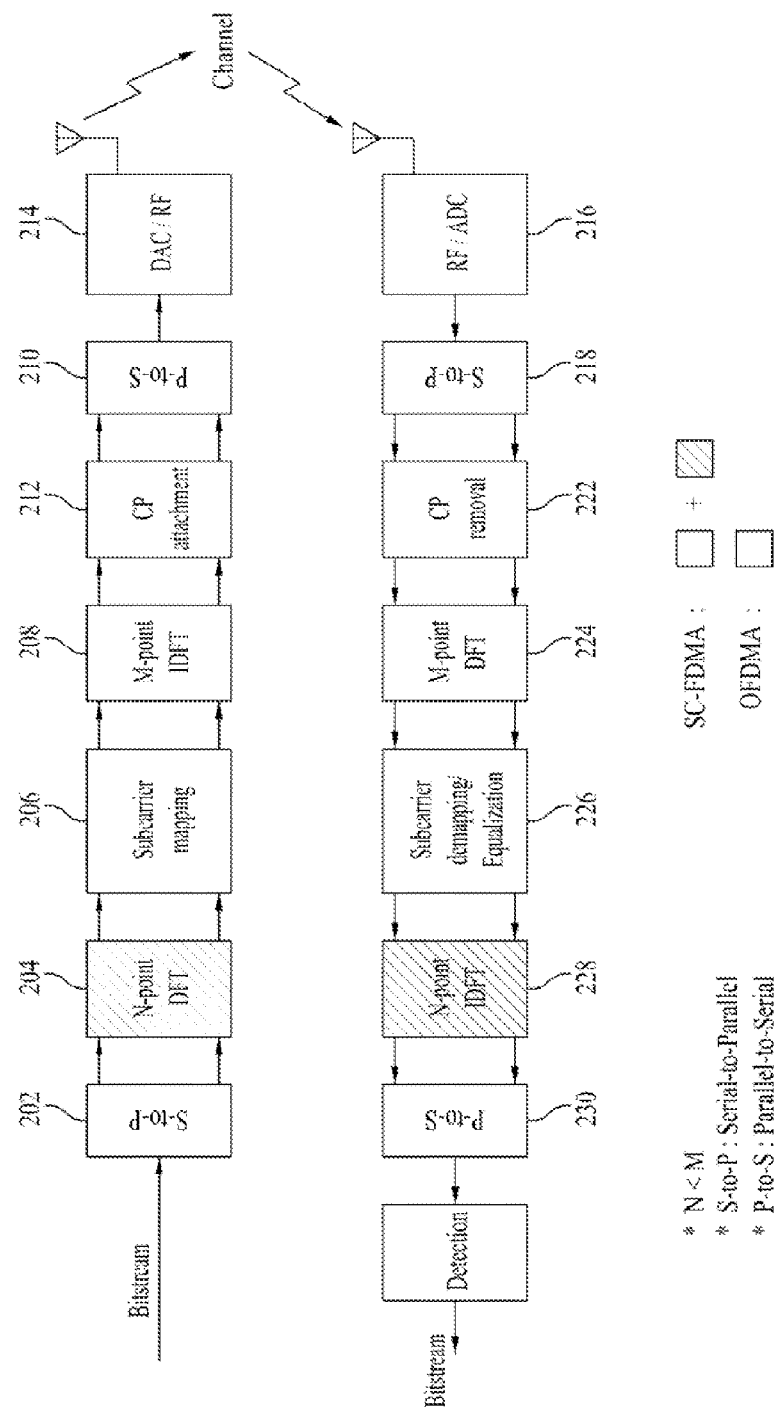
FIG. 1 is a block diagram illustrating a transmitter and a receiver for OFDMA and SC-FDMA.

FIG. 1 is a block diagram illustrating a transmitter and a receiver for OFDMA and SC-FDMA. In uplink (UL), a transmitter may be a part of a User Equipment (UE) and a receiver may be a part of a Base Station (BS). In downlink (DL), the transmitter may be a part of the BS and the receiver may be a part of the UE.

Referring to FIG. 1, an OFDMA transmitter includes a serial-to-parallel converter 202, a subcarrier mapping module 206, an M-point Inverse Discrete Fourier Transform (IDFT) module 208, a Cyclic Prefix (CP) attachment module 210, a parallel-to-serial converter 212, and a Radio Frequency (RF)/Digital-to-Analog Converter (DAC) module 214.

Signal processing in the OFDMA transmitter is as follows. First, a bitstream is modulated into a data symbol sequence. The bitstream may be obtained by performing various types of signal processing including channel encoding, interleaving, and scrambling of a data block delivered from a Medium Access Control (MAC) layer. The bitstream is also referred to as a codeword and is equivalent to a data block received from the MAC layer. The data block received from the MAC layer is referred to as a transport block, as well. A. modulation scheme may include, but is not limited to, Binary Phase Shift Keying (BPSK), Quadrature Phase Shift Keying (QPSK), and n-Quadrature Amplitude Modulation (n-QAM). Next, a serial data symbol sequence is converted into data symbols N by N in parallel (202). The N data symbols are mapped to N subcarriers allocated among a total of M subcarriers and the (M-N) remaining subcarriers are padded with 0s (206). The data symbol mapped in a frequency domain is converted to a time-domain sequence through M-point IDFT processing (208). Thereafter, in order to reduce Inter-Symbol Interference (ISI) and Inter-Carrier Interference (ICI), an OFDMA symbol is generated by attaching a CP to the time-domain sequence (210). The generated parallel OFDMA symbol is converted into a serial OFDMA symbol (212). The OFDMA symbol is then transmitted to a receiver through digital-to-analog conversion, frequency upconversion, and the like (214). Available subcarriers among the (M-N) remaining subcarriers are allocated to another user. Meanwhile, an OFDMA receiver includes an RF/Analog-to-Digital Converter (ADC) module 216, a serial-to-parallel converter 218, a CP removal module 220, an M-point Discrete Fourier Transform (DFT) module 224, a subcarrier demapping/equalization module 226, a parallel-to-serial converter 228, and a detection module 230. A signal processing process of the OFDMA receiver has a configuration opposite to that of the OFDMA transmitter.

Meanwhile, compared to the OFDMA transmitter, an SC-FDMA transmitter further includes an N-point DFT module 204 before the subcarrier mapping module 206. The SC-FDMA transmitter spreads a plurality of data in a frequency domain through DFT prior to IDFT processing, thereby considerably decreasing a Peak-to-Average Power Ratio (PAPR) of a transmission signal in comparison with an OFDMA scheme. Compared to the OFDMA receiver, an SC-FDMA receiver further includes an N-point IDFT module 226 after the subcarrier demapping module 226. A signal processing process of the SC-FDMA receiver has configuration opposite to that of the SC-FDMA transmitter.

Figure 2:
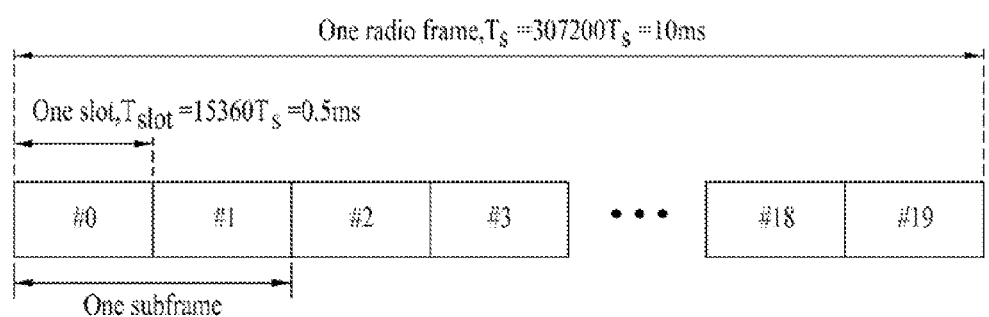
FIG. 2 illustrates the structure of a radio frame.

FIG. 2 illustrates the structure of a radio frame.

Referring to FIG. 2, a radio frame has a length of 10 ms and includes 10 sub-frames. Each of the subframes has a length of 1 ms and includes two slots. Each of the slots has a length of 0.5 ms. In FIG. 2, $T_s$ denotes a sampling time, and may foe represented by $T_s=1/(15 \text{ kHz} \times 2048)=3.2552 \times 10^{-8}$ (about 33 ns). Each slot includes a plurality of OFDM symbols in a time domain and includes a plurality of Resource Blocks (RBs) in a frequency domain. The above-described radio frame structure is purely exemplary and various modifications may be made in the number of subframes/slots/transmission symbols.

Figure 3:
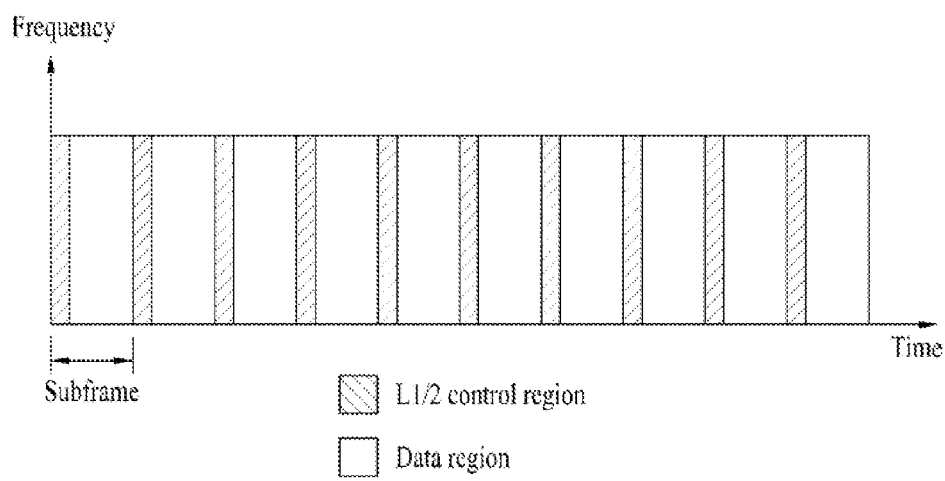
FIGS. 3 and 4 illustrate the structures of a downlink frame and physical channels.
Figure 4:
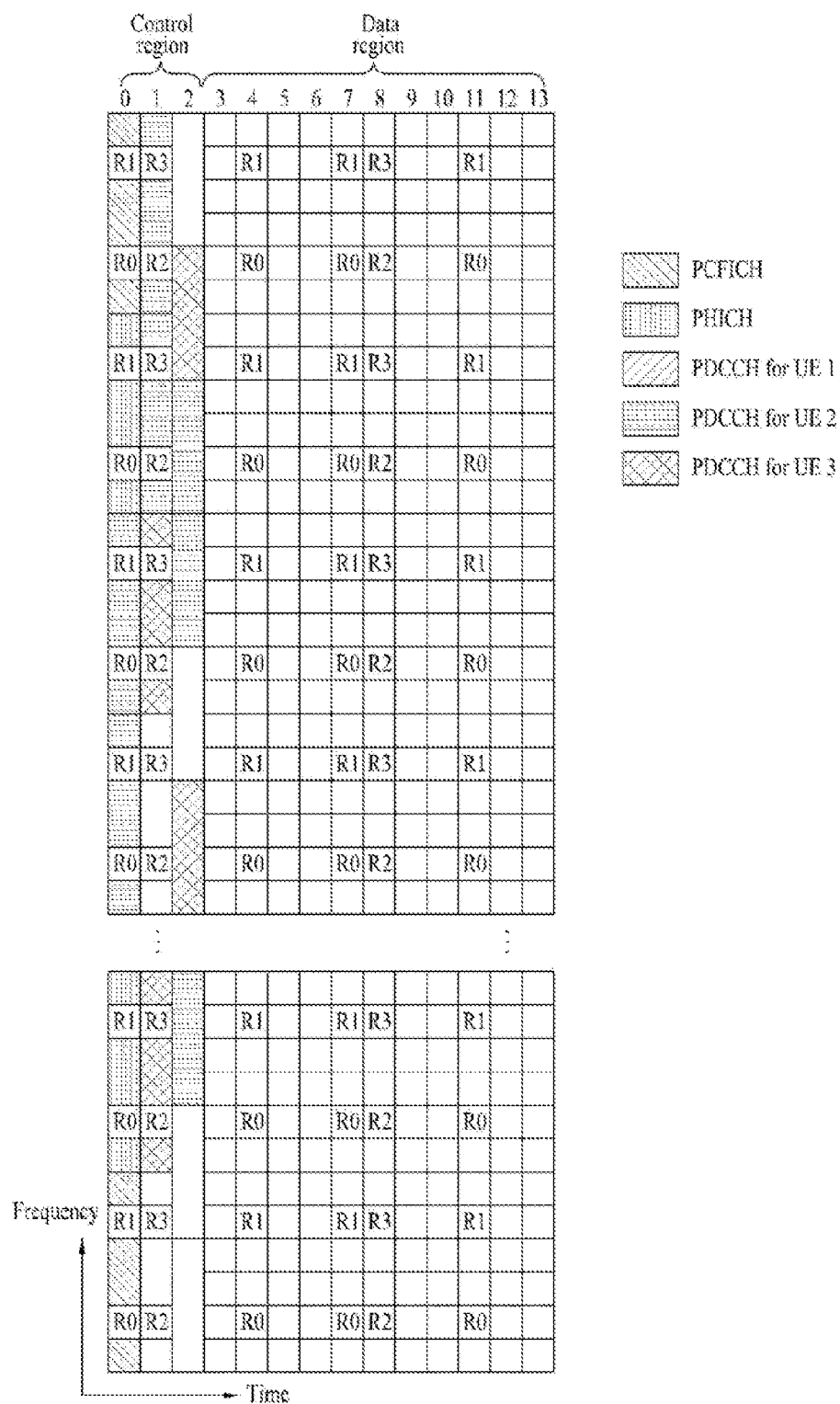

FIGS. 3 and 4 illustrate the structures of a DL frame and physical channels.

Referring to FIG. 3, a subframe includes a control region for transmitting scheduling information and control information and a data region for transmitting DL data. Referring to FIG. 4, the control region is started from the first OFDMA symbol of the subframe and includes one or more OFDMA symbols. The size of the control region may be independently configured with respect to each subframe. In FIG. 4, R1 to R4 denote Cell Specific RSs (CRSs) for antennas 0 to 3. The control region includes a Physical Control Format Indicator Channel (PCFICH), a Physical Hybrid ARQ Indicator Channel (PHICH), and a Physical Downlink Control Channel (PDCCH). The data region includes a Physical Shared Channel (PDSCH). A basic resource unit constituting the control channel is a Resource Element Group (REG). The REG consists of four Resource Elements (REs) adjacent to one another while excluding Reference Signals (RSs). An RE is a minimum unit of a time-frequency resource and is defined as one subcarrier and one OFDMA symbol. The RE is indicated by an index pair of (k,l) wherein k denotes a subcarrier index and l denotes an OFDMA symbol index.

The PCFICH, physical control format indicator channel, informs a UE of the number of OFDMA symbols used for a PDCCH in each subframe. The PHICH carries HARQ ACK/NACK for UL data and includes three REGs. The PHICH will be described later in detail with reference to the drawings. The PDCCH, physical downlink control channel, is assigned to the first n number of OFDM symbols of a subframe. Herein, n is an integer equal to or greater than 1, which is indicated by the PCFICH. The PDCCH is assigned in units of Control Channel Element (CCEs). One CCE includes 9 REGs. The PDCCH indicates information on resource assignment of a Paging Channel (PCH) and Downlink-Shared Channel (DL-SCH) which are transport channels, uplink scheduling grant, HARQ information, etc. The PCH and DL-SCH are transmitted through the PDSCH. A BS and a UE generally transmit and receive data through the PDSCH except for a specific control signal or specific service data. Information indicating to which UE (one or a plurality of UEs) the data of the PDSCH is transmitted and information indicating how UEs receive and decode the data of the PDSCH is transmitted in a state of being included in the PDCCH. For example, it is assumed that a specific PDCCH is CRC-masked with a Radio Network Temporary Identity (RNTI) "A", and information about data transmitted using a radio resource (e.g., frequency location) "B" and transmission format information (e.g., transmission block size, modulation scheme, coding information, etc.) "C" is transmitted via a specific subframe. In this case, one or more UEs located within a cell monitor the PDCCH using RNTI information thereof, and one or more UEs having "A" RNTI receive the PDCCH and receive the PDSCH indicated by "B" and "C" through the information about the received PDCCH.

Figure 5:
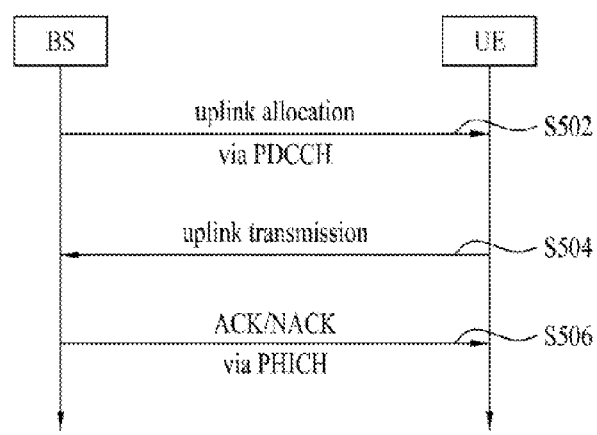
FIG. 5 illustrates a method for transmitting an ACK/NACK signal for uplink data.

FIG. 5 illustrates a method for transmitting an ACK/NACK signal for UL data in an LTE system. Referring to FIG. 5, a network node (e.g. BS) transmits UL allocation information to a UE via a PDCCH (S502). Control information for UL allocation is referred to as a UL grant and includes resource block allocation information for PUSCH transmission and cyclic shift information for a Data Demodulation Reference Signal (DMRS). Next, the UE transmits UL data (e.g. a PUSCH) to the BS according to UL allocation information (S504). The BS receives the UL data from the UE and transmits a reception response signal to the UL data to the UE via a PHICH (S506).

A plurality of PHICHs may be mapped to the same resource elements and constitutes a PHICH group. The PHICHs within the same PHICH group are distinguished through orthogonal sequences. A PHICH resource is identified by an index pair $(n_{PHICH}^{group}, n_{PHICH}^{seq})$, where $n_{PHICH}^{group}$ is a PHICH group number and $n_{PHICH}^{seq}$ is an orthogonal sequence index within the PHICH group. $n_{PHICH}^{group}$ and $n_{PHICH}^{seq}$ are identified using the lowest Physical Resource Block (PRB) index among PRB indexes allocated for PUSCH transmission and using cyclic shift of a DMRS transmitted as a UL grant. Equation 1 shows an example for acquiring $n_{PHICH}^{group}$ and $n_{PHICH}^{seq}$.

$$n_{PHICH}^{group} = (I_{PRB\_RA}^{lowest\_index} + n_{DMRS}) \bmod N_{PHICH}^{group} + I_{PHICH} N_{PHICH}^{group}$$

$$n_{PHICH}^{seq} = (\lfloor I_{PRB\_RA}^{lowest\_index} / N_{PHICH}^{group} \rfloor + n_{DMRS}) \bmod 2 N_{SF}^{PHICH} \quad \text{[Equation 1]}$$

where $n_{DMRS}$ is mapped from a cyclic shift value for a DMRS. $N_{SF}^{PHICH}$ denotes a spreading factor size used for PHICH modulation, $I_{PRB\_RA}^{lowest\_index}$ denotes the lowest PRB index for PUSCH transmission, $N_{PHICH}^{group}$ denotes the number of PHICH groups, and $I_{PHICH}$ has a value of 0 or 1 according to a type of a frame or a subframe.

Table 1 shows exemplary mapping between $n_{DMRS}$ and a cyclic shift value in a DMRS field.

TABLE 1

| Cyclic Shift for DMRS Field in DCI format 0 | $n_{DMRS}$ |
|---|---|
| 000 | 0 |
| 001 | 1 |
| 010 | 2 |
| 011 | 3 |
| 100 | 4 |
| 101 | 5 |
| 110 | 6 |
| 111 | 7 |

*DCI (Downlink Control Information) format 0: indicates DL control information format used for carrying UL allocation information in LTE.

In the case of an FDD frame (frame structure type 1), the number of PHICH groups, $N_{PHICH}^{group}$, is the same in all subframes and the number of PHICH groups in one subframe is given by Equation 2.

$$N_{PHICH}^{group} = \begin{cases} \lceil N_g (N_{RB}^{DL}/8) \rceil & \text{for normal cyclic prefix} \\ 2 \cdot \lceil N_g (N_{RB}^{DL}/8) \rceil & \text{for extended cyclic prefix} \end{cases} \quad \text{[Equation 2]}$$

where $N_g \in \{1/6, 1/2, 1, 2\}$ provided from a higher layer and $N_{RB}^{DL}$ denotes the number of RBs of a DL band.

In the case of a TDD frame (frame structure type 2) the number of PHICH groups may differ according to a DL subframe and is given by $m_i \cdot N_{PHICH}^{group}$. Table 2 shows $m_i$.

TABLE 2

| Uplink-downlink configuration | Subframe number i | | | | | | | | | |
|---|---|---|---|---|---|---|---|---|---|---|
| | 0 | 1 | 2 | 3 | 4 | 5 | 6 | 7 | 8 | 9 |
| 0 | 2 | 1 | — | — | — | 2 | 1 | — | — | — |
| 1 | 0 | 1 | — | — | 1 | 0 | 1 | — | — | 1 |
| 2 | 0 | 0 | — | 1 | 0 | 0 | 0 | — | 1 | 0 |

TABLE 2-continued

| Uplink-downlink configuration | Subframe number i | | | | | | | | | |
|---|---|---|---|---|---|---|---|---|---|---|
| | 0 | 1 | 2 | 3 | 4 | 5 | 6 | 7 | 8 | 9 |
| 3 | 1 | 0 | — | — | — | 0 | 0 | 0 | 1 | 1 |
| 4 | 0 | 0 | — | — | 0 | 0 | 0 | 0 | 1 | 1 |
| 5 | 0 | 0 | — | 0 | 0 | 0 | 0 | 0 | 1 | 0 |
| 6 | 1 | 1 | — | — | — | 1 | 1 | — | — | 1 |

Figure 6:
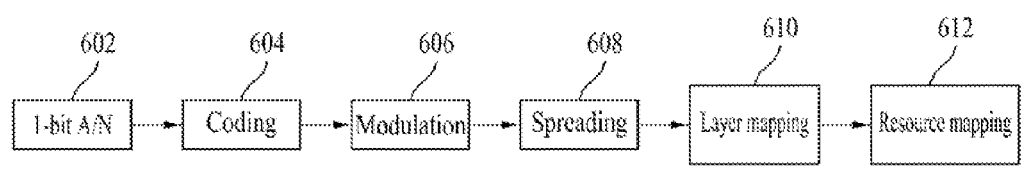
FIG. 6 illustrates a PHICH signal processing process/block.

FIG. 6 illustrates a PHICH signal processing process/block. Referring to FIG. 6, a PHICH signal processing process includes ACK/NACK (A/N) generation 602, (channel) coding 604, modulation 606, spreading 608, layer mapping 610, and resource mapping 612.

The ACK/NACK generation block 602 generates a 1-bit ACK/NACK according to a decoding result of a PUSCH (corresponding to a data stream, codeword, or transport block) received from a UE. Since an LTE system does not use Single User Multiple Input Multiple Output (SU-MIMO) in UL, only a 1-bit ACK/NACK for PUSCH transmission of one UE, i.e. for a single data stream, is transmitted through a PHICH. Hereinafter, the 1-bit ACK/NACK generated from the ACK/NACK generation block 602 will be referred to as a HARQ Indicator (HI).

Figure 7:
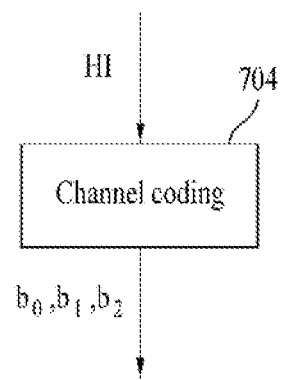
FIG. 7 illustrates a channel coding block for an HI.

FIG. 7 illustrates a channel coding block for an HI. Referring to FIGS. 6 and 7, coding blocks 604 and 704 of legacy LTE generate a 3-bit HI codeword ($b_0$, $b_1$, $b_2$) using repetition coding at a code rate ⅓ from a 1-bit HI. An HI of 1 indicates positive acknowledgement and an HI of 0 indicates negative acknowledgement, or vice versa.

Table 3 shows the relationship between an HI and an HI codeword in legacy LTE.

TABLE 3

| HI | HI codeword <$b_0$,$b_1$,$b_2$> |
|---|---|
| 0 | <0,0,0> |
| 1 | <1,1,1> |

Next, the modulation block 606 modulates a bit block $b(0), \ldots, b(M_{bit}-1)$ (i.e. HI codeword) transmitted over one PHICH into a modulation symbol block $z(0), \ldots, z(M_s-1)$ having a complex value. In an LTE system, the PHICH is modulated using Binary Phase Shift Keying (BPSK).

The spreading block 608 spreads the modulation symbol block $z(0), \ldots, z(M_s-1)$ symbol-wise by multiplying the modulation symbol by an orthogonal sequence and applies scrambling, thereby generating a modulation symbol sequence $d(0), \ldots, d(M_{symb}-1)$. Equation 3 indicates a processing process of the spreading block 608.

$$d(i) = w(i \bmod N_{SF}^{PHICH}) \cdot (1-2c(i)) \cdot z(\lfloor i/N_{SF}^{PHICH} \rfloor)$$ [Equation 3]

where $i=0, \ldots, M_{symb}-1$, $M_{symb} = N_{SF}^{PHICH} \cdot M_s$, $$N_{SF}^{PHICH} = \begin{cases} 4 & \text{normal cyclic prefix} \\ 2 & \text{extended cyclic prefix,} \end{cases}$$

and c(i) denotes a cell-specific scrambling sequence. A scrambling sequence generator may be initialized to $c_{init} = (\lfloor n_s/2 \rfloor + 1) \cdot (2N_{ID}^{cell}+1) \cdot 2^9 + N_{ID}^{cell}$ in every subframe, where $n_s$ denotes a subframe index and $N_{ID}^{cell}$ denotes a cell identifier.

The sequence [$w(0) \ldots w(N_{SF}^{PHICH}-1)$] denotes an orthogonal sequence for a PHICH and the sequence index $n_{PHICH}^{seq}$ corresponds to a PHICH number within a PHICH group.

Table 4 indicates the spreading sequence [$w(0) \ldots w(N_{SF}^{PHICH}-1)$].

TABLE 4

| Sequence index $n_{PHICH}^{seq}$ | Orthogonal sequence | |
|---|---|---|
| | Normal cyclic prefix $N_{SF}^{PHICH}=4$ | Extended cyclic prefix $N_{SF}^{PHICH}=2$ |
| 0 | [+1 +1 +1 +1] | [+1 +1] |
| 1 | [+1 −1 +1 −1] | [+1 −1] |
| 2 | [+1 +1 −1 −1] | [+j +j] |
| 3 | [+1 −1 −1 +1] | [+j −j] |
| 4 | [+j +j +j +j] | — |
| 5 | [+j −j +j −j] | — |
| 6 | [+j +j −j −j] | — |
| 7 | [+j −j −j +j] | — |

The layer mapping block 610 performs resource group arrangement, layer mapping, and precoding. Resource group arrangement indicates arrangement of the spread modulation symbol sequence $d(0), \ldots, d(M_{symb}-1)$ in unit of an REG to provide a symbol block $d^{(0)}(0), \ldots, d^{(0)}(c \cdot M_{symb}-1)$. In she case of a normal Cyclic Prefix (CP), c=1 and, in the case of an extended CP, c=2. Equation 4 shows a method for performing resource group arrangement.

In a normal CP case: $d^{(0)}(i) = d(i)$, [Equation 4]

for $i = 0, \ldots, M_{symb} - 1$

In an extended CP case:

$$[d^{(0)}(4i) \quad d^{(0)}(4i+1) \quad d^{(0)}(4i+2) \quad d^{(0)}(4i+3)]^T =$$
$$\begin{cases} [d(2i) \quad d(2i+1) \quad 0 \quad 0]^T & n_{PHICH}^{group} \bmod 2 = 0 \\ [0 \quad 0 \quad d(2i) \quad d(2i+1)]^T & n_{PHICH}^{group} \bmod 2 = 1, \end{cases}$$

for $i = 0, \ldots, (M_{symb}/2) - 1$

Next, the symbol block $d^{(0)}(0), \ldots, d^{(0)}(c \cdot M_{symb}-1)$ is converted into a vector block $y(i)=[y^{(0)}(i) \ldots y^{(P-1)}(i)]^T$ ($i=0, \ldots, c \cdot M_{symb}-1$) through layer mapping and precoding, where $y^{(p)}(i)$ denotes a signal for an antenna port p (p=0, \ldots, P−1). In LTE, the number of antenna ports for a cell-specific reference signal is $P \in \{1, 2, 4\}$. Layer mapping and precoding depend on the length of a CP and the number of antenna ports used for PHICH transmission.

If a PHICH is transmitted through a single antenna port (P=1), layer mapping and precoding are performed using Equation 5 and Equation 6, respectively.

$$x^{(0)}(i) = d^{(0)}(i)$$ [Equation 5]

$$y^{(p)}(i) = x^{(0)}(i)$$ [Equation 6]

In Equation 5 and Equation 6, $i=0, 1, \ldots, M_{symb}^{layer}-1$, $M_{symb}^{layer} = M_{symb}^{(0)}/2$, and $M_{symb}^{(0)} = c \cdot M_{symb}$. In a normal CP, c=1 and, in an extended CP, c=2. p denotes the number of antenna ports.

If a PHICH is transmitted through two antenna ports (P=2), layer mapping and precoding are performed using Equation 7 and Equation 8, respectively.

$$x^{(0)}(i) = d^{(0)}(2i)$$
$$x^{(1)}(i) = d^{(0)}(2i+1)$$

[Equation 7]

$$\begin{bmatrix} y^{(0)}(2i) \\ y^{(1)}(2i) \\ y^{(0)}(2i+1) \\ y^{(1)}(2i+1) \end{bmatrix} = \frac{1}{\sqrt{2}} \begin{bmatrix} 1 & 0 & j & 0 \\ 0 & -1 & 0 & j \\ 0 & 1 & 0 & j \\ 1 & 0 & -j & 0 \end{bmatrix} \begin{bmatrix} \mathrm{Re}(x^{(0)}(i)) \\ \mathrm{Re}(x^{(1)}(i)) \\ \mathrm{Im}(x^{(0)}(i)) \\ \mathrm{Im}(x^{(1)}(i)) \end{bmatrix}$$

[Equation 8]

In Equation 7 and Equation 8, $i = 0, 1, \ldots, M_{symb}^{layer} - 1$, $M_{symb}^{layer} = M_{symb}^{(0)}/2$, and $M_{symb}^{(0)} = c \cdot M_{symb}$.

If a PHICH is transmitted through four antenna ports (P=4), layer mapping and precoding are performed using Equation 9 and Equation 10, respectively.

[Equation 9]

$$\begin{bmatrix} y^{(0)}(4i) \\ y^{(1)}(4i) \\ y^{(2)}(4i) \\ y^{(3)}(4i) \\ y^{(0)}(4i+1) \\ y^{(1)}(4i+1) \\ y^{(2)}(4i+1) \\ y^{(3)}(4i+1) \\ y^{(0)}(4i+2) \\ y^{(1)}(4i+2) \\ y^{(2)}(4i+2) \\ y^{(3)}(4i+2) \\ y^{(0)}(4i+3) \\ y^{(1)}(4i+3) \\ y^{(2)}(4i+3) \\ y^{(3)}(4i+3) \end{bmatrix} = \frac{1}{\sqrt{2}} \begin{bmatrix} 1 & 0 & 0 & 0 & j & 0 & 0 & 0 \\ 0 & 0 & 0 & 0 & 0 & 0 & 0 & 0 \\ 0 & -1 & 0 & 0 & 0 & j & 0 & 0 \\ 0 & 0 & 0 & 0 & 0 & 0 & 0 & 0 \\ 0 & 1 & 0 & 0 & 0 & j & 0 & 0 \\ 0 & 0 & 0 & 0 & 0 & 0 & 0 & 0 \\ 1 & 0 & 0 & 0 & -j & 0 & 0 & 0 \\ 0 & 0 & 0 & 0 & 0 & 0 & 0 & 0 \\ 0 & 0 & 1 & 0 & 0 & 0 & j & 0 \\ 0 & 0 & 0 & 0 & 0 & 0 & 0 & 0 \\ 0 & 0 & 0 & -1 & 0 & 0 & 0 & j \\ 0 & 0 & 0 & 0 & 0 & 0 & 0 & 0 \\ 0 & 0 & 0 & 1 & 0 & 0 & 0 & j \\ 0 & 0 & 0 & 0 & 0 & 0 & 0 & 0 \\ 0 & 0 & 1 & 0 & 0 & 0 & -j & 0 \end{bmatrix} \begin{bmatrix} \mathrm{Re}(x^{(0)}(i)) \\ \mathrm{Re}(x^{(1)}(i)) \\ \mathrm{Re}(x^{(2)}(i)) \\ \mathrm{Re}(x^{(3)}(i)) \\ \mathrm{Im}(x^{(0)}(i)) \\ \mathrm{Im}(x^{(1)}(i)) \\ \mathrm{Im}(x^{(2)}(i)) \\ \mathrm{Im}(x^{(3)}(i)) \end{bmatrix}$$

[Equation 10]

$$\begin{bmatrix} y^{(0)}(4i) \\ y^{(1)}(4i) \\ y^{(2)}(4i) \\ y^{(3)}(4i) \\ y^{(0)}(4i+1) \\ y^{(1)}(4i+1) \\ y^{(2)}(4i+1) \\ y^{(3)}(4i+1) \\ y^{(0)}(4i+2) \\ y^{(1)}(4i+2) \\ y^{(2)}(4i+2) \\ y^{(3)}(4i+2) \\ y^{(0)}(4i+3) \\ y^{(1)}(4i+3) \\ y^{(2)}(4i+3) \\ y^{(3)}(4i+3) \end{bmatrix} =$$

In the case of $(i + n_{PHICH}^{group}) \bmod 2 = 0$ (normal CP) or $(i + \lfloor n_{PHICH}^{group}/2 \rfloor) \bmod 2 = 0$ (extended CP), Equation 9 is used and, in the other cases, Equation 10 is used. $n_{PHICH}^{group}$ is a PHICH group number and $i = 0, 1, 2$.

The resource mapping block 612 performs various operations for mapping the spread symbol sequence received from the layer mapping block 610 to a physical resource. A sequence $\overline{y}^{(p)}(0), \ldots, \overline{y}^{(p)}(M_{symb}^{(b)} - 1)$ for each PHICH group is defined as indicated by Equation 11.

$$\overline{y}^{(p)}(n) = \Sigma y_i^{(p)}(n)$$

[Equation 11]

where sum is performed with respect to all PHICHs within a PHICH group, $y_i^{(p)}(n)$ denotes a symbol sequence of an i-th PHICH within a PHICH group, and p is an antenna port.

Thereafter, a PHICH group is mapped to a PHICH mapping unit. Mapping between a PHICH group m and a PHICH mapping unit m' is performed according to Equation 12 and Equation 13. Equation 12 corresponds to a normal CP case and Equation 13 corresponds to an extended CP case.

$$\tilde{y}_m^{(p)}(n) = \overline{y}_m^{(p)}(n)$$

[Equation 12]

where $$m' = m = \begin{cases} 0, 1, \ldots, N_{PHICH}^{group} - 1 & \text{for frame structure type 1} \\ 0, 1, \ldots, m_i \cdot N_{PHICH}^{group} - 1 & \text{for frame structure type 2} \end{cases}$$

and $m_i$ is shown in Table 2.

$$\tilde{y}_{m'}^{(p)}(n) = \bar{y}_m^{(p)}(n) + \bar{y}_{m+1}^{(p)}(n) \quad \text{[Equation 13]}$$

where $$m = \begin{cases} 0, 2, \ldots, N_{PHICH}^{group} - 2 & \text{for frame structure type 1} \\ 0, 2, \ldots, m_i \cdot N_{PHICH}^{group} - 2 & \text{for frame structure type 2} \end{cases}$$

and $m_i$ is shown in Table 2. In the extended CP, two PHICH groups m and m+1 correspond to one PHICH mapping unit m'.

For resource mapping, $z^{(p)}(i) = \langle \tilde{y}^{(p)}(4i), \tilde{y}^{(p)}(4i+1), \tilde{y}^{(p)}(4i+2), \tilde{y}^{(p)}(4i+3) \rangle$ (where i=0, 1, 2) is referred to as a symbol quadruplet for an antenna port p. Mapping of a PHICH mapping unit to resource elements is performed in units of a symbol quadruplet.

Table 5 shows mapping of a PHICH mapping unit to resource elements.

Table 6 shows a PHICH duration defined in LTE. The PHICH duration is configured by a higher layer.

TABLE 6

| PHICH duration | Non-MBSFN subframes | | MBSFN subframes |
|---|---|---|---|
| | Subframes 1 and 6 in case of frame structure type 2 | All other cases | On a carrier Supporting both PDSCH and PMCH |
| Normal | 1 | 1 | 1 |
| Extended | 2 | 3 | 2 |

Figure 8:
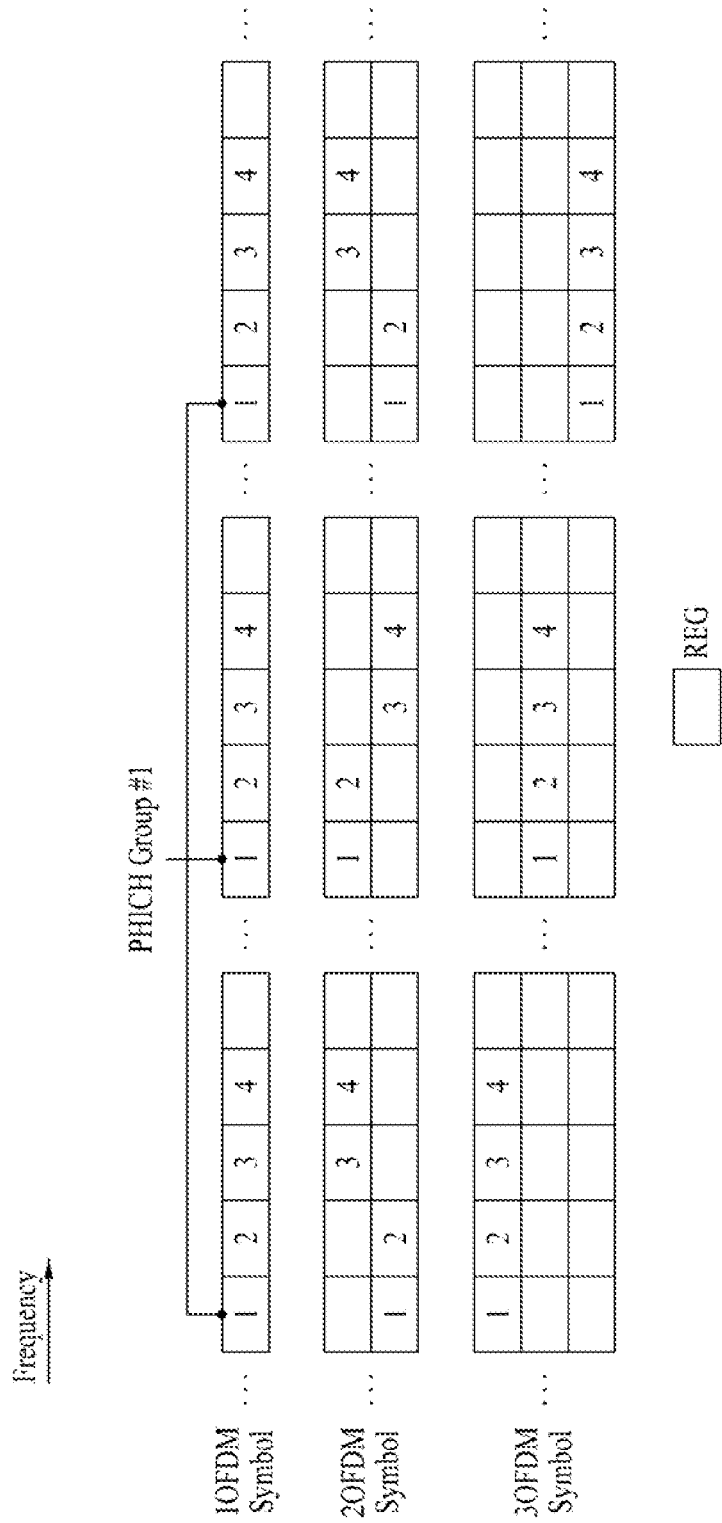
FIG. 8 illustrates exemplary PHICH allocation in a control region.

FIG. 8 illustrates exemplary PHICH allocation in a control region according to Table 5. A PHICH is mapped to the remaining REGs except for PCFICHs and RSs within an OFDMA symbol.

Referring to FIG. 8, a PHICH group is transmitted using three REGs which are as far distant from each other as possible in a frequency domain. Consequently, each bit of an HI codeword is transmitted through each REG. PHICH groups are successively allocated in the frequency domain. In FIG. 8, the same numbers represent REGs belonging to the same PHICH group. The PHICH duration is restricted by the size of a control region and corresponds to first to third OFDMA symbols. If a plurality of OFDMA symbols is used for PHICH transmission, REGs belonging to the same PHICH group are transmitted using different OFDM symbols for transmit diversity.

TABLE 5

1) For each value of l'
  2) Let $n_{l'}$ denote the number of resource element groups not assigned to PCFICH in OFDM symbol l'
  3) Number the resource-element groups not assigned to PCFICH in OFDM symbol l'
    from 0 to $n_{l'} - 1$, starting from the resource-element group with the lowest frequency-domain index.
4) Initialize m' = 0 (PHICH mapping unit number)
5) For each value of i = 0,1,2
  6) Symbol-quadruplet $z^{(p)}(i)$ from PHICH mapping unit m' is mapped to the resource-element group
    represented by $(k', l')_i$ where the indices $k_i'$ and $l_i'$ are given by steps 7 and 8 below:
    7) The time-domain index $l_i'$ is given by $$l_i' = \begin{cases} 0 & \text{normal PHICH duration, all subframes} \\ (\lfloor m'/2 \rfloor + i + 1) \bmod 2 & \text{extended PHICH duration, MBSFN subframes} \\ (\lfloor m'/2 \rfloor + i + 1) \bmod 2 & \text{extended PHICH duration, subframe 1 and 6 in frame structure type 2} \\ i & \text{otherwise} \end{cases}$$

8) Set the frequency-domain index $k_i'$ to the resource-element group assigned the
      number $\bar{n}_i$ in step 3 above, where $\bar{n}_i$ is given by $$\bar{n}_i = \begin{cases} (\lfloor N_{ID}^{cell} \cdot n_{l_i'} / n_1 \rfloor + m') \bmod n_{l_i'} & i = 0 \\ (\lfloor N_{ID}^{cell} \cdot n_{l_i'} / n_1 \rfloor + m' + \lfloor n_{l_i'}/3 \rfloor) \bmod n_{l_i'} & i = 1 \\ (\lfloor N_{ID}^{cell} \cdot n_{l_i'} / n_1 \rfloor + m' + \lfloor 2n_{l_i'}/3 \rfloor) \bmod n_{l_i'} & i = 2 \end{cases}$$

in case of extended PHICH duration in MBSFN subframes, or extended PHICH
    duration in subframes 1 and 6 for frame structure type 2 and by $$\bar{n}_i = \begin{cases} (\lfloor N_{ID}^{cell} \cdot n_{l_i'} / n_0 \rfloor + m') \bmod n_{l_i'} & i = 0 \\ (\lfloor N_{ID}^{cell} \cdot n_{l_i'} / n_0 \rfloor + m' + \lfloor n_{l_i'}/3 \rfloor) \bmod n_{l_i'} & i = 1 \\ (\lfloor N_{ID}^{cell} \cdot n_{l_i'} / n_0 \rfloor + m' + \lfloor 2n_{l_i'}/3 \rfloor) \bmod n_{l_i'} & i = 2 \end{cases}$$

otherwise.
9) Increase m' by 1.
10) Repeat from step 5 until all PHICH mapping units have been assigned.

Figure 9:
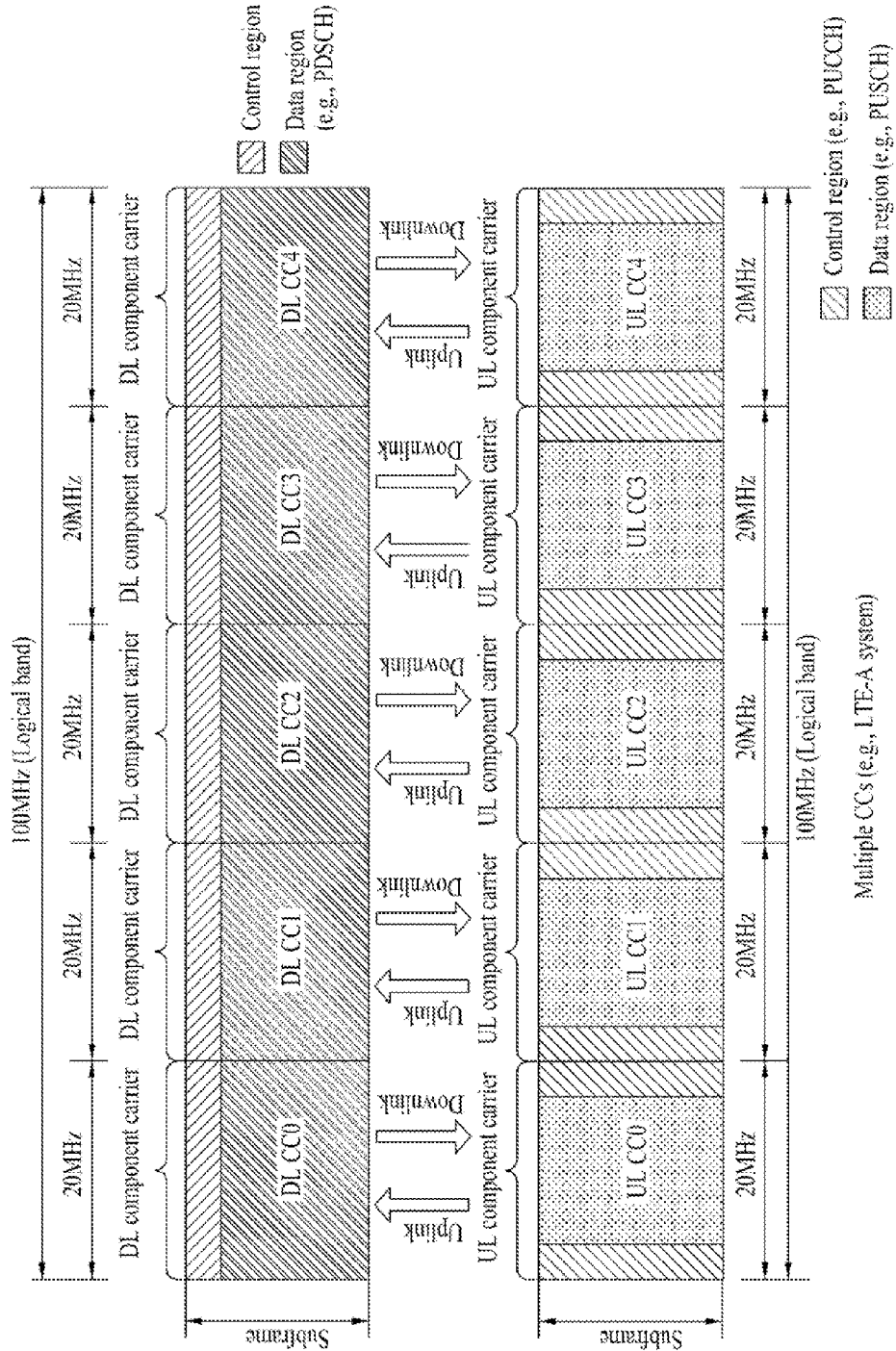
FIG. 9 illustrates a carrier aggregation communication system.

FIG. 9 illustrates a Carrier Aggregation (CA) communication system. Referring to FIG. 9, a plurality of UL/DL Component Carriers (CCs) is aggregated to support wider UL/DL bandwidth. The CCs may be contiguous or non-contiguous in the frequency domain. For convenience, FIG. 9 shows the case in which the bandwidth of each UL CC is the same as the bandwidth of each DL CC, and UL CCs are symmetrical to DL CCs. However, the bandwidth of each CC may be independently determined. Asymmetric CA in which the number of UL CCs is different from the number of DL CCs may be configured. Asymmetric CA may be generated by restriction of an available frequency band or may be intentionally generated by network configuration. For example, even if a total system band includes N CCs, a frequency band which can be received by a UE may be restricted to M CCs (where M<N). Meanwhile, a UE may be configured such that it receives control information only through a specific DL CC. Such a specific DL CC is referred to as a primary DL CC (or a primary cell) and the other DL CCs may be referred to as secondary DL CCs (or secondary cells).

Meanwhile, for some reasons (e.g. asymmetrical CA, TDD mode, relay backhaul link, UL MIMO, etc.), the number of ACK/NACK signals which should be transmitted through one DL subframe may be considerably increased. In UL MIMO for example, an LTE-A UE can transmit a maximum of two UL codewords (or transport blocks). In this case, it is desirable that an HARQ response to UL transmission of the UE be transmitted per UL codeword (or transport block). Since one HI is 1-bit information representing the state of ACK (e.g. HI=1) or NACK (e.g. HI=0) for one UL codeword (or transport block), a total of two bits is needed to transmit DL ACKs or NACKs corresponding to two UL codewords (or transport blocks).

In technology of legacy LTE (Rel-8/9), only one HI (i.e. a 1-bit HI) can be transmitted in one PHICH resource (i.e. one index pair ($n_{PHICH}^{group}$, $n_{PHICH}^{seq}$)). As the simplest method for transmitting a 2-bit HI according to a situation (e.g. UL MIMO) in which a plurality of DL ACKs/NACKs should be transmitted, two PHICH resources may be allocated so that each of DL ACKs/NACKs is transmitted using a different PHICH resource per UL codeword (or transport block). However, when two PHICH resources are used for one UE, the number of PHICH resources may be insufficient. Especially, when a CA situation as shown in FIG. 9 is assumed, a BS should transmit an independent HI per UL CC to a UE and a transmission method based on multiple PHICH resources may seriously worsen the problem.

The present invention is devised to solve the above problem and proposes a method for a plurality of HIs using one PHICH resource and an apparatus therefor. Meanwhile, legacy LTE guarantees transmission reliability by transmitting an HI three times through one PHICH resource. Accordingly, when a plurality of HIs is transmitted through one PHICH resource under the premise that a PHICH structure of legacy LTE is maintained, the number of repetitive transmissions per HI is reduced and thus transmission reliability may be decreased. To solve this problem, the present invention proposes an improved PHICH channel coding scheme. More specifically, when an N2-bit HI codeword is generated from N1 HIs (where N1<N2), N1 elements of the HI codeword may directly indicate values for the respective His and the other (N2−N1) elements may indicate joint coding (or operation) values for the N1 HIs, By doing so, each HI can commonly obtain diversity gain or coding gain by the (N2−N1) elements of the HI codeword.

FIGS. 10 to 13 illustrate examples of channel coding of HIs according to an exemplary embodiment of the present invention. Processing processes before and after channel coding are the same as the processes described with reference to FIG. 6. Although the following description is described based on a BS, the process performed by the BS may be reversely performed by a UE.

Figure 10:
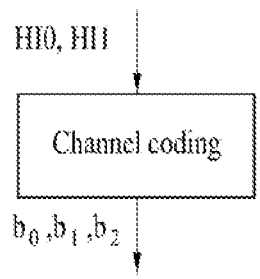

Referring to FIG. 10, a BS generates HIs HI0 and HI1 with respect to two PUSCHs received from a UE. A channel coding block generates a 3-bit HI codeword ($b_0$, $b_1$, $b_2$) from the HIs HI0 and HI1. In the HI codeword, $b_0$ and $b_1$ are generated by HI0 and HI1, respectively, and $b_2$ is generated through an exclusive OR (XOR) operation of $b_0$ and $b_1$. That is, first and second HI codeword elements among three HI codeword elements are generated by HI0 and HI1, and a third HI codeword element is generated through an XOR operation of the first HI codeword element and the second HI codeword element. Although an XOR operation of a bit level has been described by way of example to aid in understanding, other schemes for producing the same result are also within the scope of the present invention. For example, BPSK modulation may be performed with respect to each bit and an operation corresponding thereto may be performed. Specifically, assuming that $b_0$=0 and $b_1$=1, since an XOR operation of $b_0$ and $b_1$ is 1, $b_2$ is 1. If BPSK modulation is performed with respect to $b_0$, $b_1$, $b_2$, then 1, −1, −1 ($c_0$, $c_1$, $c_2$) is generated. Since $c_2 = c_0 * c_1$, an XOR operation of a bit level (i.e. channel coding process) is the same as a multiplication operation of a complex signal level (i.e. after modulation).

The present invention can be generalized as follows. It is assumed that an HI is N1 bits (i.e. N1 1-bit HIs) and an HI codeword is N2 bits (where N2>N1). A channel coding scheme of the present invention is characterized in that N1 columns indicate different $2^{N1}$ states when arbitrarily selecting N1 columns from a matrix of a $2^{N1}*N2$ size corresponding to an HI codeword set. Accordingly, in PHICH channel coding, any scheme indicating such a channel coding characteristic is within the scope of the present invention.

Table 7 shows a channel coding scheme of FIG. 10 and Table 8 indicates that the channel coding scheme of FIG. 10 satisfies the above-described channel coding characteristic.

TABLE 7

| HI0 | HI1 | HI codeword < b0,b1,b2 > |
|---|---|---|
| 0 | 0 | <0,0,0> |
| 0 | 1 | <0,1,1> |
| 1 | 0 | <1,0,1> |
| 1 | 1 | <1,1,0> |

Herein, it is assumed that an HI of 1 indicates ACK and an HI of 0 indicates NACK. It is also assumed that HI0 denotes a HARQ indicator for a UL codeword 0 (or UL transport block 0) and HI1 denotes an HARQ indicator for a UL codeword 1 (or UL transport block 1).

TABLE 8

| In case of selecting b0,b1 | In case of selecting b0,b2 | In case of selecting b1,b2 |
|---|---|---|
| <0,0> | <0,0> | <0,0> |
| <0,1> | <0,1> | <1,1> |
| <1,0> | <1,1> | <0,1> |
| <1,1> | <1,0> | <1,0> |

Number of states: 4 (=$2^2$)

Figures 13, 14:
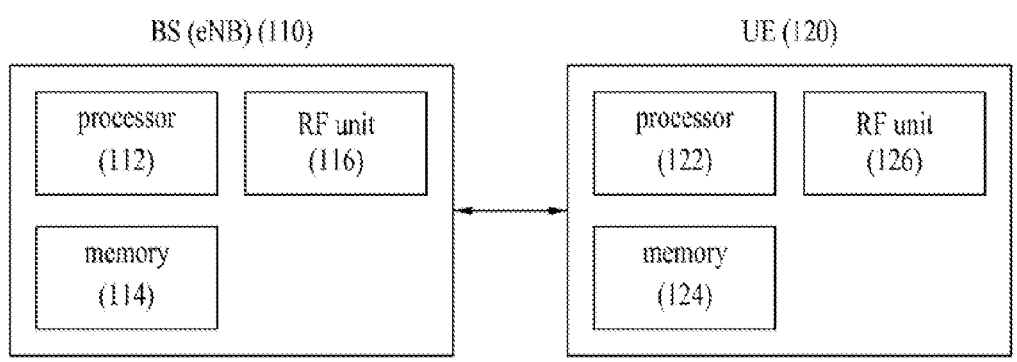

FIG. 11 is the same as FIG. 10 except that an HI of 0 is assumed to indicate ACK and an HI of 1 is assumed to indicate NACK. FIG. 12 is the same as FIG. 10 except that an HI of 0 is assumed to indicate ACK, an HI of 1 is assumed to indicate NACK, and $b_2$ is obtained from NXOR ($b_0$, $b_1$) or XNOR ($b_0$, $b_1$). NXOR indicates a not XOR operation and XNOR indicates an exclusive NOR operation. FIG. 13 is the same as FIG. 10 except that $b_2$ is obtained from NXOR ($b_0$, $b_1$) or XNOR ($b_0$, $b_1$). The channel coding schemes shown in FIGS. 11 to 13 all satisfy the channel coding characteristics of the present invention described in FIG. 10. Namely, even if two columns are arbitrarily selected from a matrix of a 4*3 size corresponding to an HI codeword set, the selected two columns represent four different states.

An HI codeword generated by the present invention has the following advantages. First, the Hamming distance between HI codewords is 2 and is all uniform. Second, since HI codeword elements $b_0$, $b_1$, $b_2$ are transmitted through REGs which are as far distant from each other as possible in the frequency domain in an actual transmission process, frequency diversity can be expected. Third, even though one bit among a 3-bit HI codeword is lost, decoding can be effectively performed. Fourth, PHICH resources can be effectively used while perfect backward compatibility is maintained by reusing a PHICH format/processing process of legacy LTE. Therefore, multiple HIs can be efficiently used in a UL MIMO CA situation.

FIG. 14 is a block diagram illustrating a BS and a UE which are applicable to an exemplary embodiment of the present invention.

Referring to FIG. 14, a radio communication system includes a BS 110 and a UE 120. The BS 110 includes a processor 112, a memory 114, and a Radio Frequency (RF) unit 116, The processor 112 may be configured to implement the procedures and/or methods proposed in the present invention. The memory 114 is connected to the processor 112 and stores information related to operation of the processor 112. The RF unit 116 is connected to the processor 112 and transmits and/or receives radio signals. The UE 120 includes a processor 122, a memory 124, and an RF unit 126. The processor 122 may be configured to implement the procedures and/or methods proposed in the present invention. The memory 124 is connected to the processor 122 and stores information related to operation of the processor 122. The RF unit 126 is connected to the processor 122 and transmits and/or receives radio signals. The BS 110 and/or the UE 120 may have a single antenna or multiple antennas.

The above-described embodiments are combinations of constituent elements and features of the present invention in a predetermined form. The constituent elements or features should be considered selectively unless otherwise mentioned. Each constituent element or feature may be practiced without being combined with other constituent elements or features. Further, the embodiments of the present invention may be constructed by combining partial constituent elements and/or partial features. Operation orders described in the embodiments of the present invention may be rearranged. Some constructions or features of any one embodiment may be included in another embodiment or may be replaced with corresponding constructions or features of another embodiment. It is apparent that the embodiments may be constructed by a combination of claims which do not have an explicitly cited relationship in the appended claims or may include new claims by amendment after application.

In the present document, a description has been made of a data transmission and reception relationship between a UE and a BS. Here, a specific operation described as performed by the BS may be performed by an upper node of the BS. Namely, it is apparent that, in a network comprised of a plurality of network nodes including the BS, various operations performed for communication with the UE may be performed by the BS, or network nodes other than the BS. The term BS may be replaced with the term fixed station, Node B, eNode B (eNB), access point, etc. The term UE may be replaced with the term Mobile Station (MS), Mobile Subscriber Station (MSS), etc.

The embodiments of the present invention may be achieved by various means, for example, hardware, firmware, software, or a combination thereof. In a hardware configuration, the exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the exemplary embodiments of the present invention may be achieved by a module, a procedure, a function, etc. performing the above-described functions or operations. Software code may be stored in a memory unit and executed by a processor. The memory unit may be located at the interior or exterior of the processor and may transmit and receive data to and from the processor via various known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention may be applied to a wireless communication system. Specifically, the present invention is applicable to a method for transmitting a DL ACK/NACK and an apparatus therefor.

The invention claimed is:

1. A method for transmitting, at a base station, a Physical Hybrid Automatic Repeat reQuest (HARQ) Indicator Channel (PHICH) in a wireless communication system, the method comprising:
channel-coding HARQ indicators (HI0 and HI1) to provide HI codeword (b0, b1, b2) in accordance with table 1;
spreading the HI codeword (b0, b1, b2) to provide spread sequences, each spread sequence corresponding to a respective bit of the HI codeword (b0, b1, b2); and
transmitting each spread sequence through a respective Resource Element Group (REG) of the PHICH, each REG including 4 neighboring subcarriers in an Orthogonal Frequency Division Modulation (OFDM) symbol,
wherein the first bit (b0) and the second bit (b1) of the HI codeword are generated by the HI0 and HI1, respectively; and the third bit (b2) of the HI codeword is a result of an exclusive OR (XOR) of the first bit (b0) of the HI codeword and the second bit (b1) of the HI codeword,

TABLE 1

| HI0 | HI1 | HI codeword <$b_0$,$b_1$,$b_2$> |
|---|---|---|
| 0 | 0 | <1,1,0> |
| 0 | 1 | <1,0,1> |

TABLE 1-continued

| HI0 | HI1 | HI codeword <$b_0,b_1,b_2$> |
|---|---|---|
| 1 | 0 | <0,1,1> |
| 1 | 1 | <0,0,0>. |

2. A method for processing, at a user equipment, a Physical Hybrid Automatic Repeat reQuest (HARQ) Indicator Channel (PHICH) in a wireless communication system, the method comprising:
receiving spread sequences corresponding to HARQ indicator (HI) codeword (b0, b1, b2) through Resource Element Groups (REGs), wherein each spread sequence corresponds to a respective bit of the HI codeword (b0, b1, b2) and is mapped on a respective Resource Element Group (REG) of the PHICH, and each REG includes 4 neighboring subcarriers in an Orthogonal Frequency Division Modulation (OFDM) symbol;
de-spreading the spread sequences to provide the HI codeword (b0, b1, b2); and
channel-decoding the HI codeword (b0, b1, b2) to provide HARQ indicators (HI0 and HI1) in accordance with table 1,
wherein the first bit (b0) and the second bit (b1) of the HI codeword correspond to the HI0 and HI1, respectively; and the third bit (b2) of the HI codeword is a result of an exclusive OR (XOR) of the first bit (b0) of the HI codeword and the second bit (b1) of the HI codeword,

TABLE 1

| HI0 | HI1 | HI codeword <$b_0,b_1,b_2$> |
|---|---|---|
| 0 | 0 | <1,1,0> |
| 0 | 1 | <1,0,1> |
| 1 | 0 | <0,1,1> |
| 1 | 1 | <0,0,0>. |

3. A base station configured to transmit a Physical Hybrid Automatic Repeat reQuest (HARQ) Indicator Channel (PHICH) in a wireless communication system, the base station comprising:
a Radio Frequency (RF) unit; and
a processor,
wherein the processor is configured to
channel-code HARQ indicators (HI0 and HI1) to provide HI codeword (b0, b1, b2) in accordance with table 1,
spread the HI codeword (b0, b1, b2) to provide spread sequences, each spread sequence corresponding to a respective bit of the HI codeword (b0, b1, b2), and
transmit each spread sequence through a respective Resource Element Group (REG) of the PHICH, each REG including 4 neighboring subcarriers in an Orthogonal Frequency Division Modulation (OFDM) symbol,
wherein the first bit (b0) and the second bit (b1) of the HI codeword are generated by the HI0 and HI1, respectively; and the third bit (b2) of the HI codeword is a result of an exclusive OR (XOR) of the first bit (b0) of the HI codeword and the second bit (b1) of the HI codeword,

TABLE 1

| HI0 | HI1 | HI codeword <$b_0,b_1,b_2$> |
|---|---|---|
| 0 | 0 | <1,1,0> |
| 0 | 1 | <1,0,1> |
| 1 | 0 | <0,1,1> |
| 1 | 1 | <0,0,0>. |

4. A user equipment configured to process a Physical Hybrid Automatic Repeat reQuest (HARQ) Indicator Channel (PHICH) in a wireless communication system, the user equipment comprising:
a Radio Frequency (RF) unit; and
a processor,
wherein the processor is configured to
receive spread sequences corresponding to HARQ indicator (HI) codeword (b0, b1, b2) through Resource Element Groups (REGs), wherein each spread sequence corresponds to a respective bit of the HI codeword (b0, b1, b2) and is mapped on a respective Resource Element Group (REG) of the PHICH, and each REG includes 4 neighboring subcarriers in an Orthogonal Frequency Division Modulation (OFDM) symbol;
de-spread the spread sequences to provide the HI codeword (b0, b1, b2), and channel-decode the HI codeword (b0, b1, b2) to provide HARQ indicators (HI0 and HI1) in accordance with table 1,
wherein the first bit (b0) and the second bit (b1) of the HI codeword correspond to the HI0 and HI1, respectively; and the third bit (b2) of the HI codeword is a result of an exclusive OR (XOR) of the first bit (b0) of the HI codeword and the second bit (b1) of the HI codeword,

TABLE 1

| HI0 | HI1 | HI codeword <$b_0,b_1,b_2$> |
|---|---|---|
| 0 | 0 | <1,1,0> |
| 0 | 1 | <1,0,1> |
| 1 | 0 | <0,1,1> |
| 1 | 1 | <0,0,0>. |

* * * * *